April 19, 1955  J. E. JACOBS  2,706,792
X-RAY DETECTION
Original Filed May 25, 1951

INVENTOR:—
JOHN E. JACOBS
BY:—
Junius F. Cook, Jr.
ATT'Y

United States Patent Office 2,706,792
Patented Apr. 19, 1955

2,706,792

X-RAY DETECTION

John E. Jacobs, Milwaukee, Wis., assignor to General Electric Company, a corporation of New York Original application May 25, 1951, Serial No. 228,333. Divided and this application July 7, 1954, Serial No. 441,873

11 Claims. (Cl. 250—83.3)

The present invention relates in general to photosensitive semi-conductors, and has more particular reference to current amplifying semi-conductor materials of unusual photosensitivity particularly well suited for X-ray detection purposes, the same comprising subject matter divided from a copending application for United States Letters Patent, Serial No. 228,333, which was filed May 25, 1951.

Light, broadly speaking, comprises energy emanations or rays of vibratory character having wave lengths within the range of the spectrum, and including visible light rays as well as rays of invisible character, such as ultra violet and infrared rays, X-rays, gamma rays, electromagnetic waves, and other rays of vibratory character including rays comprising alpha and beta particles and electrons, the various ray categories being identified each by its characteristic vibratory frequency or wave length range, commonly expressed in Angstrom units or centimeters.

For the purpose of the present disclosure, a photosensitive semi-conductor may be defined as a material having electrical resistance, or reactance, or both, which vary in accordance with the intensity of rays to which the material is exposed, a particular semi-conductor usually being usefully responsive only to rays within a limited wave length range, characteristic to the semi-conductor, and relatively or entirely unresponsive to other rays.

Electrical resistance and electrical reactance, either inductive or capacity reactance, or both, are the characteristics of electrical conductors which tend to prevent or impede the flow of electrical current therethrough under the influence of an electromotive force. The combined current flow resistive effect of resistance and reactance, in a given conductor material, is commonly referred to as the electrical impedance of the material.

A semi-conductor, in the absence of light rays to which it is responsive, may have impedance characteristics of such high order as to constitute the material substantially as an insulator capable of preventing the flow of electrical current therethrough; or the impedance, while of high order, may permit minimal current to flow in the absence of exciting rays. The current, if any, thus allowed to flow, in the absence of irradiation may be termed the "dark current." When irradiated with rays to which it is responsive, the impedance of a semi-conductor may be reduced as a proportional function of incident ray intensity, whereby the material becomes electrically conductive in proportion to the intensity of exciting rays impinging thereon, and consequently will allow proportionally larger current flow in the semi-conductor. The ability of a semi-conductor thus to alter its impedance in response to the intensity of incident light rays impinging thereon, may be employed for many useful purposes, by connecting the semi-conductor in suitable electrical translation systems designated to perform, or to control the performance of, desired work operations, in response to ray induced changes in the impedance of the so connected semi-conductor.

Perhaps the most widely known semi-conductors are those which are particularly responsive to visible light, or to invisible rays, such as infrared and ultra violet rays, of wave length adjacent that of visible light in the light spectrum, such semi-conductors being virtual insulators except when exposed to light rays in the visible light spectrum and adjacent infrared and ultra violet spectral regions. These commonly known semi-conductors are not sufficiently responsive to X-rays to allow the useful application thereof to X-ray detecting purposes; in fact, no semi-conductor material, effectively responsive to X-rays, was known prior to the invention set forth in a copending application for United States Letters Patent, Serial No. 190,801, filed October 18, 1950, on the invention of John E. Jacobs, relating generally to the novel use of cadmium sulphide as a semi-conductor having current amplifying characteristics for photosensitive purposes, and specifically to the employment of cadmium sulphide as an X-ray detector.

An important object of the present invention resides in providing an effective X-ray responsive semi-conductor material, which is not only sensitive to X-rays but also to light rays within a wide wavelength band, including visible light rays, the material however being especially well suited for X-ray detecting purposes.

Another important object of the invention is to provide effective X-ray responsive control means adapted to the performance of any desired control function, including X-ray inspection of subjects or objects requiring inspection, X-ray intensity control, regulation of the operating power supplied to X-ray generator equipment, interval timing of X-ray application, and any other operation desirably accomplished in response to the existence of or intensity or duration of detectable X-rays.

Another important object is to apply cadmium selenide as a photosensitive semi-conductor material; a further object being to apply the material as a sensitive X-ray detector, and to provide for employing the same effectively in the detection of X-rays as well as other rays.

Another important object resides in the provision of means for employing cadmium selenide as a semi-conductor and for applying the same effectively as a ray detector, by rendering its ray responsive characteristics exceedingly sensitive; a still further object being to provide for sensitizing cadmium selenide as a ray detector by applying thereto, as a sensitizing bias, light rays of selected wavelength different from that of the rays to which it is desired to render the semi-conductor sensitive.

Still another object is to provide for biasing cadmium selenide, specifically for X-ray sensitivity, by applying thereto a visible light bias having wavelength of the order of 5200 Angstroms.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings.

Briefly stated, the present invention provides for the detection of penetrating rays, such as X-rays, by using crystalline cadmium selenide as a detector, the response of the detector to incident rays being determined by measuring the alternating current impedance of the detector material, as distinguished from its direct current resistance. In accordance with a preferred mode of practicing the invention, the impedance of the detector is measured in terms of electrical potential produced in an impedance measuring circuit connected with the detector, such potential being applied, as through a suitable translation system, to control the actuation of a relay comprising a load device operable in response to predetermined variation in the intensity of penetrating rays impinging upon the detector. The invention also teaches the possibility of increasing the response sensitivity of cadmium selenide as a ray detector by applying light rays having wave length of the order of 5200 Angstroms as a bias on the detector.

To illustrate the invention, the drawings show a semiconductor element 11, interconnected in a suitable electrical translation system 12, designed to measure the impedance of the element 11 in terms of electrical power delivered to a load device 13 connected with the output side of the system. The load 13, of course, may comprise any suitable means for the performance of any desired operation in response to changes in the measured impedance of the element 11.

Figure 1:
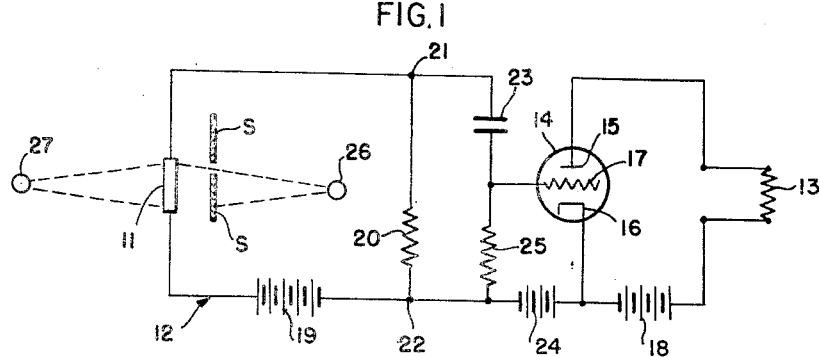
Fig. 1 is a diagrammatic showing of apparatus embodying a semi-conductor for ray detecting purposes.

While any suitable or preferred translation system may be employed, the same, as shown in Fig. 1 of the drawings, preferably comprises an electronic amplifier including an amplifying tube 14 having an anode plate 15, a cathode 16, and a control grid 17, the plate 15 and cathode 16 being interconnected in an output circuit, including a suitable source of plate circuit power 18 and the operable device or load 13. The control grid 17 is interconnected in a control circuit in which the element 11 is also operatively connected, in order that the grid 17 may be electrically energized in accordance with the transitory impedance values of the element 11.

As shown, the control circuit may comprise the element 11, a preferably uni-directional power source 19, and a ballast or control resistor 20 interconnected in series, so that electrical potential corresponding with the impedance characteristics of the element 11 may be developed at the opposite ends 21 and 22 of the resistor 20. The control grid 17 may be connected with the control circuit at the connection point 21, preferably through a condenser 23, for filtering uni-directional voltage components and allowing the application only of fluctuating voltage components on the grid 17. If it be desired to apply uni-directional as well as fluctuating voltage components, on the control grid 17, the condenser 23 may be eliminated; and, if desired, means may be substituted for excluding fluctuating voltage components while passing only uni-directional voltage components to the grid, if it be desired to control the load device 13 in response to such uni-directional components.

Means for applying a suitable bias between the cathode 16 and grid 17 may also be provided, the same preferably comprising a suitable source 24 of grid biasing power and a regulating resistor 25 interconnected in series with the power source 24 between the cathode and the grid, the connection point 22 of the control circuit being connected with the grid bias means, as at a connection point between the cathode 16 and the resistor 25.

The element 11 comprises photosensitive semi-conductor material, preferably of the sort affording current amplification characteristics in proportion to the intensity of light rays impinging thereon. Cadmium selenide (CeSe) is such a semi-conductor, as also are mercuric sulphide (HgS) and cadmium sulphide (CdS). Semiconductors operate as such through the release of electrons entrapped in the material, such electron release being accomplished as the result of ray impingement on the material. Commonly known semi-conductors, such as selenium, operate to release electrons in direct proportion to the alteration of the electrical space charge of the substance as the result of exposure of the substance to light rays. Semi-conductors having current amplifying characteristics, however, operate by releasing many thousands or hundreds of thousands of electrons in response to alteration of the space charge. As a consequence, semi-conductors having amplification characteristics, when excited by the impingement of light rays thereon, operate in fashion comparable to the operation of an electronic amplifying device, whereas selenium and other common semi-conductors do not show such current amplifying characteristics.

The present invention not only takes advantage of the current amplifying characteristics of selected semiconductors, of which cadmium selenide, cadmium sulphide and mercury sulphide are examples, but also teaches that the responsiveness of the material may be substantially enhanced by activating the semi-conductor. To this end, the semi-conductor may be activated by applying atomic traces, of the order of one part in one million, of foreign matter, in the molecular lattice structure of the material.

Crystals of cadmium sulphide, mercury sulphide and cadmium selenide may be produced by vapor phase chemistry procedures, wherein vaporized constituent substances are mixed, under controlled conditions, and from which mingled vapors crystals of the desired material may be deposited. Cadmium or mercury sulphide crystals, for example, may be deposited from the mingled vapors of cadmium or mercury and sulphurated hydrogen. Cadmium selenide crystals, likewise, may be deposited from the mingled vapors of cadmium and selenium. Mingled vapors may be heated in a retort at temperatures of the order of 900° C. and may then be delivered to a relatively cooler chamber or zone in which crystals of the desired material may grow on the walls of the chamber at temperatures of the order of 600° C. and below. The resulting crystals may have atomic impurities, such as sulphur, selenium and the like, distributed more or less at random in the lattice structures thereof, which tend to impart photosensitive qualities in the material, such qualities being absent in material that is entirely free of lattice impurities. Atomic particles of metals, such as manganese, copper, indium and silver, may also be applied in the crystalline lattice structure for the purpose of activating crystalline cadmium or mercury sulphide, or cadmium selenide, for use as ray sensitive semi-conductors, no claim being made herein for crystalline material so activated, nor to the method of applying atomic particles of metal in the lattice structure of crystalline material since the same forms subject matter of invention claimed in the aforesaid copending application for U. S. Letters Patent Serial No. 228,333, filed May 25, 1951.

When a crystal 11 of the sort herein contemplated is exposed to X-rays emanating as from a ray source 26, the impedance of the crystal changes substantially in proportion to the intensity of impinging X-rays. Where the applied rays are of pulsating character, the impedance change in the crystal follows the pulsations of the impinging rays and consequently establishes a corresponding pulsating voltage across the resistor 20, which, being applied to the control grid 17, produces corresponding power pulsations for application to the load device 13. Irradiation of a crystal with X-rays of fluctuating intensity results in the development, across the resistor 20, of voltage having a uni-directional as well as a fluctuating component.

X-rays produced by operation of the usual X-ray generating tubes, electrically excited by alternating current power at 60 cycles, comprise X-ray energy pulsations at a frequency corresponding with that of the energizing power applied for the operation of the ray generator. X-rays of uniform, non-pulsating character may, of course, be produced and applied upon the crystal 11, in which case the voltage developed across the resistor 20 will be of uni-directional character. Consequently, the translation system 12 should be designed to measure the magnitude either of the uni-directional impedance of the crystal or the fluctuating impedance thereof, depending upon the uni-directional or fluctuating character of the impinging rays.

Semi-conductors of the character herein contemplated exhibit impedance changes when exposed to visible light rays, as from a light source 27, and the extent of such visible light induced impedance change is in proportion to the intensity of rays impinging on the crystal from the source 27. Accordingly, when a crystal is exposed to rays to which it is sensitive, from a source other than the X-ray source 26, the voltage available at the connection points 21 and 22 may contain components which correspond with the impedance value of the crystal, determined by the light rays from such other source as well as components corresponding with the rays emanating from the X-ray source 26. If the rays impinging on the crystal from the source 27 are of uniform intensity, the corresponding voltage component across the resistor 20 will be uniform. Where the impinging X-rays are of fluctuating character, the same may be applied through the condenser 23 for the control of the amplifier 14, while the uniform voltage component established by illumination of the crystal from the source 27, at uniform intensity, as well as the uni-directional X-ray induced voltage component, will be excluded from the amplifier system by the action of the condenser 23.

The present invention, of course, is not necessarily limited to the excitation of the crystal 11 by visible light or other rays from a source 27 and by pulsating X-rays from the source 26, but, in its broadest aspects, the invention applies to the excitation of the crystal 11 by means of visible light or by means of X-rays, or both, and whether or not the light rays or the X-rays pulsate, there being many possible advantageous applications involving the excitation of the crystal either by X-rays or by other light rays including visible light, where either the light rays or X-rays are of uniform or of pulsating intensity character.

Nevertheless, the teachings of the present invention have particular application in connection with detection of pulsating X-rays where the crystal is also irradiated with light rays of uniform intensity applied to the crystal as a light bias, especially where such light bias comprises green light, in the visible light spectrum and having a wave length of the order of 5200 Angstrom units; by applying such a light bias, it has been discovered that the crystal is rendered highly sensitive to impedance changes in response to X-ray irradiation, X-ray induced impedance fluctuations, when the crystal is under light bias at a wave length of 5200 Angstroms, being of the order of ten times the X-ray induced impedance fluctuations produced in the crystal by X-ray excitation thereof in the absence of a light bias.

The detection characteristics of the crystals do not alter upon exposure thereof to X-rays and other light rays. In this connection, the performance of hexagonal cadmium sulphide and cadmium selenide crystals, including standard crystals containing usual lattice impurities, and crystals activated with selected metals, have been investigated, using X-rays, having wave length of 1.54 Angstroms, for crystal excitation. The X-ray beam thus applied to the examined crystals was of pulsating character at a frequency of 60 cycles. To determine its impedance response characteristics, a suitable uni-directional electromotive force, of the sort supplied by the source 19 in Fig. 1, may be applied to the crystal and the resultant current flow therethrough accurately measured. The resulting crystal current obtained in response to pulsating X-ray irradiation of the crystal was found to contain an alternating as well as a uni-directional component. The uni-directional component was found to vary substantially linearly with the intensity of incident X-rays, the alternating component substantially as the square of incident X-ray intensity. This phenomenon is explainable upon the theory that the alternating component is proportional to the rate of recombination of electrons in the effective conduction band or zone of the irradiated crystal.

The magnitude of the uni-directional component of crystal current in crystalline cadmium sulphide and cadmium selenide was found to be approximately 10,000 times that of the alternating component at intensities of approximately $10^5$ quanta/second, in standard cadmium and mercury sulphide crystals containing "natural" impurities as activating media in the crystal structure, as well as in crystals activated with selected metallic media. The ratio was found to be somewhat variable, each crystal having its own characteristic ratio. In cadmium selenide crystals the ratio was often found to be somewhat lower than that for cadmium sulphide, indeed cadmium selenide crystals have been examined in which the ratio was as low as 100. At higher incident intensities this ratio is reduced, and it is supposed that, with increased ray intensity, the ratio approaches unity.

Figure 2:
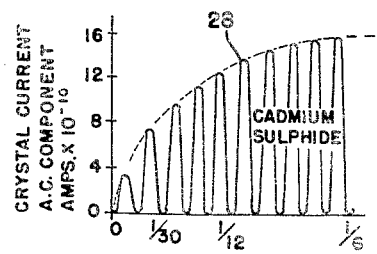
Figs. 2 and 3 are graphical charts illustrating the response of cadmium sulphide as an X-ray detector.
Figure 3:
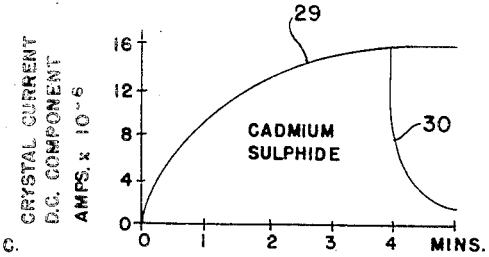
Figure 4:
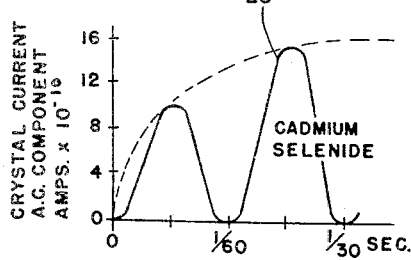
Figs. 4 and 5 are graphical charts illustrating the response of cadmium selenide as an X-ray detector, in accordance with the teachings of the present invention.
Figure 5:
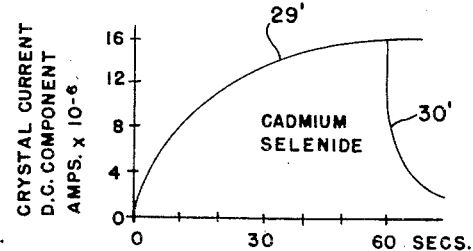

In standard CdS crystals, the time lag before crystal current reaches a maximum value following initial application of the X-ray beam is of the order of several minutes so far as the uni-directional crystal current component is concerned, but is of the order of 1/6 of a second for the alternating component, in the same crystal, as shown in Figs. 2 and 3. Cadmium selenide crystals, however, respond to X-rays several times faster than do CdS. As compared with CdS, the time lags of the uni-directional and alternating components of crystal current in standard cadmium selenide crystals, containing natural impurities as activating media, are respectively of the order of one minute and of the order of 1/30 second, as shown in Figs. 4 and 5.

The curve 28 in Fig. 2 shows the approximate alternating current impedance response obtained from standard CdS crystals, when irradiated with X-rays of intensity fluctuating between maximum and minimum at a frequency of 60 cycles per second. The curve 28' in Fig. 4 shows the corresponding response obtained under similar conditions for a CdSe crystal. The curves 29 and 29' in Figs. 3 and 5 respectively illustrate the direct current resistance characteristics of standard crystalline cadmium sulphide and cadmium selenide, containing "natural" impurities as activating media, as measured in terms of uni-directional current flow in the crystalline material following X-ray application. The curves 28' and 29' show the direct current response as well as the alternating current response of cadmium selenide to be substantially faster than that of cadmium sulphide, as depicted by the curves 28 and 29. The curves 30 and 30' respectively illustrate the decline of the uni-directional crystal current component from a maximum value following discontinuation of X-ray application upon cadmium sulphide and cadmium selenide crystals. Upon termination of X-ray irradiation on CdS and CdSe crystals, the flow of the alternating crystal current component ceases immediately upon the conclusion of the cycle of crystal current flow then in being.

It will be noted that, in cadmium selenide as well as cadmium sulphide crystals the time lag required for the uni-directional current component to reach a maximum value is many times that within which the fluctuating current component of the crystal reaches its maximum value. This phenomenon may be explained upon the theory that the fluctuating component is a measure of the change in the number of electrons present in the conduction band of the crystal, as a function of time. Accordingly, employment of the fluctuating component of crystal current, to the exclusion of the uni-directional component, will permit the almost instantaneous measurement of crystal current for the determination of X-ray intensity, thus avoiding the more extended delay necessary to achieve a stable condition in using the uni-directional current component. Measurement of the fluctuating current component only permits the advantageous use of high gain fluctuating current amplifiers in the translation system, in the interests of effective instrumentation.

Some crystals are found to exhibit random or eccentric impedance characteristics in the absence of irradiation, at polarizing field strengths in excess of 150 volts per centimeter. Other crystals, while not exhibiting such random characteristics, in the absence of irradiation may show erratic effects when irradiated. Crystals having these erratic characteristics are those containing structural imperfections and lattice distortions, as evidenced by asterism in Laue transmission patterns of the crystals. Crystals which are free from lattice distortions show none of these erratic or eccentric characteristics.

Employment of the alternating component of crystal current, for X-ray detection purposes, permits the application of secondary illumination as a light bias to the crystal for increasing the X-ray sensitivity thereof. When such a light bias is directed on a crystal, sensitive to the bias irradiation, while simultaneously irradiated with pulsating X-rays, both the uni-directional and fluctuating components of X-ray induced crystal current are increased by a factor of the order of 10, as compared with such X-ray induced components in the absence of the light bias. Each different kind of crystal may have a corresponding optimum light bias wave length producing maximum response, the response being reduced by variation of the light bias wave length above or below the optimum wave length value characteristic of the crystal. For cadmium sulphide crystals, however, regardless of the manner of activation, the optimum sensitizing effect is obtained in response to light bias having a wave length of the order of 5200 Angstroms.

In all crystals that have been examined, currents in excess of $10^6$ times the current resulting from primary ionization of the crystal in response to X-ray irradiation, were observed. Any explanation of this phenomenon must account for the release of additional electrons in the crystal to produce the observed current multiplication. The energy necessary to produce this additional or amplified crystal current can only be derived in the crystal itself. Accordingly, the crystals comprise excess electron or donor type semi-conductors which operate, in a sense, as current amplifiers under the control of visible, as well as invisible, light rays impinging thereon. In this connection, it is thought that electron donor centers in the crystals are ionized by impingement thereon of primary electrons, equilibrium occurring when electrons are being trapped to form the donor centers at the rate at which such centers are being ionized.

The present invention primarily visualizes the practical application of crystals for improved instrumentation in association with X-ray generators and auxiliary equipment. The invention additionally contemplates the possibility of using the crystals for any light detecting purposes to which the same may be suited. The crystals may be employed separately for detection purposes by placing the crystal in the path of the ray beam to be detected. So positioned, the crystal, in association with appropriate translation equipment of the sort shown in Fig. 1, or other modified translation systems for application of the principles herein revealed to particular purposes, may be used for many control purposes, including, for example, the control of the intensity of the irradiating beam at a desired value, by applying the load device 13 to control suitable equipment for directly or indirectly regulating the intensity of the beam. The apparatus may be employed for liquid level gauging purposes. A crystal and its associated translation system may be employed as a timing device to discontinue the application of the ray beam after a selected time interval, which may be determined either in terms of time or in terms of ray quanta. Many other uses to which the invention may be applied will suggest themselves to those skilled in the electronic art.

Several crystals, each with its associated translation system, may be mechanically arranged to form a sensitive screen for the examination of objects. Such screen may comprise a multiplicity of crystals mounted with their relatively negative ends facing toward the ray source to be detected, equipment embodying such screens being especially useful in the examination of products, including packaged food products, for the detection of flaws, impurities, or other characteristics of the object under examination. Since the crystals can be made in relatively small sizes, it is obvious that a detection screen of fine grain, comprising a multiplicity of closely arranged crystals, can be made for the detection of exceedingly small features of the examined object, such as small impurities in packaged food and other products.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention. No claim is made herein to either cadmium or mercury sulphide for penetrating ray detecting purposes since the same respectively form the subject matter of invention claimed in copending applications for U. S. Letters Patent Serial No. 190,801, filed October 18, 1950, on the invention of John E. Jacobs, relating generally to the use of cadmium sulphide as a penetrating ray detector, and Serial No. 232,073, filed June 18, 1951, on the invention of John E. Jacobs and Rudolf Frerichs, relating generally to the use of mercury sulphide as a penetrating ray detector.

The invention is hereby claimed as follows:

1. The method of detecting changes in the intensity level of pulsating X-rays, which comprises the application of said pulsating rays upon cadmium selenide, as a semi-conductor, to thereby rapidly alter the alternating current impedance of the semi-conductor, as a precise function of the intensity of impinging X-rays, while simultaneously changing the direct current resistance thereof at a relatively slow rate, and measuring the alternating current impedance of the semi-conductor as distinguished from the direct current resistance thereof.

2. The method set forth in claim 1 including the application of visible light rays of selected wave length as a sensitizing bias on the semi-conductor.

3. The method set forth in claim 1, including the application of visible light rays having wave length of the order of 5200 Angstroms as a sensitizing bias on the semi-conductor.

4. The method of detecting changes in the intensity level of pulsating X-rays, which comprises the application of said pulsating rays upon cadmium selenide, as a semi-conductor, to thereby rapidly alter the alternating current impedance of the semi-conductor, as a precise function of the intensity of impinging X-rays, while simultaneously changing the direct current resistance thereof at a relatively slow rate, producing a flow of current in the semi-conductor proportional to the instantaneous values of its direct current resistance and alternating current impedance, isolating the alternating current component of said flow of current from the direct current component thereof, and actuating an operable device in response to change in X-ray intensity level as measured by said alternating current component.

5. Control apparatus for actuating an operable load device in response to rapid change in the intensity level of pulsating X-rays comprising cadmium selenide as a crystalline semi-conductor element having alternating current impedance characteristics, variable precisely and substantially instantly as a function of the intensity of pulsating X-rays impinging thereon, and direct current resistance characteristics which laggingly follow any change in pulsating ray intensity, means for continuously passing a flow of current in said element, means for isolating the laggingly responsive direct current component of said current from the alternating current component thereof, and electrical translation means controlled in accordance with said alternating current component for operating the load device substantially instantly in response to rapid changes in the intensity level of said X-rays.

6. Control apparatus as set forth in claim 5, including means to apply on said semi-conductor element a light bias comprising visible light rays having a selected wave length.

7. Control apparatus as set forth in claim 5, including means to apply on said semi-conductor element a light bias comprising visible light rays having wave length of the order of 5200 Angstroms.

8. Control apparatus for actuating an operable load device in response to rapid change in the intensity level of pulsating X-rays comprising cadmium selenide as a crystalline semi-conductor element having alternating current impedance characteristics, variable precisely and substantially instantly as a function of the intensity of pulsating X-rays impinging thereon, and direct current resistance characteristics which laggingly follow any change in pulsating ray intensity, a resistor connected in series with said element, means for continuously passing a flow of current through said resistor and element to develop potential fluctuating as a function of the laggingly responsive direct current resistance and the precisely responsive alternating current impedance of said element, an electronic amplifier having a control grid and drivingly connected with said load device for actuating the same, and a coupling condenser for applying on said grid a controlling potential corresponding with the instantaneous values of the alternating current impedance characteristics of said element.

9. Control apparatus for actuating an operable load device in response to rapid change in the intensity level of pulsating X-rays comprising a cadmium selenide crystalline semi-conductor element having alternating current impedance characteristics, variable precisely and substantially instantly as a function of the intensity of pulsating X-rays impinging thereon, and direct current resistance characteristics which laggingly follow any change in pulsating ray intensity, a measuring circuit in series connection with said element for circulating therethrough a flow of electric current having alternating current and direct current components respectively proportional to the instantaneous values of the impedance and resistance characteristics of said element, an electronic amplifier having a control grid and drivingly connected with said load device for actuating the same, and a coupling network interconnected with said circuit and said grid for applying said alternating current component on said grid while excluding said direct current component therefrom.

10. X-ray detection apparatus comprising a load device to be operated in response to the detection of X-rays, crystalline cadmium selenide forming a detection element adapted for exposure to X-rays, means for applying light rays of wave length of the order of 5200 Angstroms and of selected substantially constant intensity, as a sensitizing bias on said detection element, means to measure the impedance of said element comprising an electrical power source and a resistor connected in circuit with said detection element, an electron flow amplifier having a control grid, said amplifier being controllingly connected with said load device, and a coupling condenser interconnecting the grid of said amplifier with said circuit to actuate the amplifier in accordance with the alternating current impedance of the detection element as measured in said circuit.

11. X-ray detection apparatus comprising a load device to be operated in response to the detection of X-rays, crystalline cadmium selenide forming a detection element adapted for exposure to the action of X-rays, means for applying light rays of selected wave length and of selected substantially constant intensity as a sensitizing bias on said detection element, means to measure the impedance of said element comprising an electrical power source and a resistor connected in circuit with said detection element, an electron flow translation device having a control grid, said translation device being controllingly connected with said load device, and a coupling condenser interconnecting the grid of said translation device with said circuit to actuate the device in accordance with the alternating current impedance of the detection element as measured in said circuit.

References Cited in the file of this patent

UNITED STATES PATENTS

| | | |
|---|---|---|
| 1,751,361 | Ruben | Mar. 18, 1930 |
| 2,218,750 | Hinderer | Oct. 22, 1940 |
| 2,505,633 | Whaley | Apr. 25, 1950 |
| 2,508,098 | Chilowsky | May 16, 1950 |
| 2,537,388 | Wooldridge | Jan. 9, 1951 |
| 2,540,490 | Rittner | Feb. 6, 1951 |
| 2,543,039 | McKay | Feb. 27, 1951 |
| 2,546,239 | Rothschild | Mar. 27, 1951 |
| 2,547,173 | Rittner | Apr. 3, 1951 |
| 2,604,596 | Ahearn | July 22, 1952 |

OTHER REFERENCES

Crystal Counters—Hofstadter—Nucleonics April 1949, pp. 2–27.

On the Conductivity Produced in CdS Crystals by Irradiation With Gamma-Rays—Frerichs Phys. Rev. vol. 67 #2, Dec. 15, 1949, pp. 1869–1875.

Photoelectricity—Allen 1913. Publ. by Longmans, Green & Co., New York, N. Y., pp. 75–79.

Physical Rev. Series II, Vol. II, 1917, pp. 305–306.

The Physics of Electronic Semiconductors—Pearson Technical Paper 47—34 published by Bell Telephone Laboratories Inc., New York, December 1946, pages 1–14.

Photo-Conductivity of Incomplete Phosphors—Frerichs Phys. Rev., vol. 72, #7, Oct. 1, 1947, pp. 594–601.